United States Patent [19]

Wallis

[11] Patent Number: 4,572,489
[45] Date of Patent: Feb. 25, 1986

[54] NITROGEN DIE CYLINDER

[76] Inventor: Bernard J. Wallis, 25315 Kean Ave., Dearborn, Mich. 48124

[21] Appl. No.: 620,681

[22] Filed: Jun. 14, 1984

[51] Int. Cl.⁴ .............................................. F16F 9/02
[52] U.S. Cl. ................................ 267/119; 267/64.11; 267/130; 92/134
[58] Field of Search .................. 425/542, 406; 91/416; 92/86, 134, 85 B; 267/119, 64.11, 130, 126; 188/286

[56] References Cited

U.S. PATENT DOCUMENTS

| | | | |
|---|---|---|---|
| 1,229,029 | 6/1917 | Burbage | 251/273 |
| 3,401,604 | 9/1968 | Blatt et al. | 91/416 |
| 3,789,737 | 2/1974 | Burnett | 91/416 |
| 4,342,448 | 8/1982 | Wallis | 92/168 |
| 4,457,498 | 7/1984 | Pauliukonis | 267/119 |

FOREIGN PATENT DOCUMENTS 1590050 5/1981 United Kingdom .................... 92/86

Primary Examiner—Paul E. Maslousky
Attorney, Agent, or Firm—Barnes, Kisselle, Raisch, Choate, Whittemore & Hulbert

[57] ABSTRACT

A piston-cylinder unit for use in a die is threaded into a port of a nitrogen manifold. The piston has a seal thereon slideably engaging the cylinder bore and has a rod projecting out one end of the cylinder, the rod being biased by the gas pressure at the threaded end of the cylinder into engagement with a die member reciprocated in response to reciprocation of the ram of the press in which the die is mounted. The portion of the cylinder threaded into the manifold has a bleed passageway therethrough which communicates with the interior of the cylinder below the seal on the rod when the press ram is at bottom dead center position and with the interior of the cylinder above the seal on the piston when the piston rod is fully retracted.

1 Claim, 3 Drawing Figures

NITROGEN DIE CYLINDER

This invention relates to nitrogen die cylinders.

In press operations it is common practice to employ die springs in the form of fluid cylinders connected to or mounted on a manifold containing nitrogen under relatively high pressure. The nitrogen pressure frequently employed is 1,000 p.s.i. or more so that a relatively small diameter cylinder is capable of exerting a substantially large force. One type of nitrogen die cylinder unit frequently used is in the form of an outer cylinder having a lower open end threaded into a port of the nitrogen manifold. Within the cylinder there is slideably arranged a piston having a piston rod projecting outwardly through the opposite end of the cylinder. The piston rod has a diameter slightly smaller than the cylinder bore so that a narrow annular chamber is formed between the outer periphery of the rod and the bore of the cylinder.

In use, this narrow annular chamber is sealed from the surrounding atmosphere by a seal in the cylinder bore which also prevents ingress to the cylinder of contaminants in the atmosphere surrounding the die. The annular chamber is also sealed from the manifold by a seal around the piston. However, after a period of operation the high pressure gas in the manifold will inevitably leak across the seal on the piston and into the annular chamber so that this chamber becomes pressurized. In die cylinders of this type the piston is usually provided with a central expansion-compression chamber therein which communicates with the annular chamber and which is sealed from the manifold by a threaded plug.

When it is desired to remove the cylinder unit for servicing or replacement, the pressure in the manifold is reduced to atmospheric. However, since the annular chamber is sealed, it remains pressurized. Accordingly, when the cylinder unit is removed from the manifold, the threaded plug on the piston should be loosened to relieve the pressure in the annular chamber before attempting to remove the piston from within the cylinder. However, this precaution is frequently overlooked by service personnel. If it is attempted to remove the piston from within the cylinder without first loosening the threaded plug, the pressure in the annular chamber can propel the piston out of the cylinder with a relatively high force and possibly cause serious injury or damage.

The object of the present invention is to provide a die cylinder unit that is designed to insure that the sealed annular chamber is automatically relieved of pressure when the manifold is conditioned for removal of the cylinder unit.

More specifically, the die cylinder unit of the present invention is formed with a bleed passageway through the portion of the cylinder which threads into the manifold port, the bleed passageway being so arranged as to relieve the pressure in the annular chamber when, prior to the removal of the cylinder unit from the manifold, the manifold pressure is relieved.

Other objects, features and advantages of the present invention will become apparent from the following description and accompanying drawing, in which.

Figure 1:
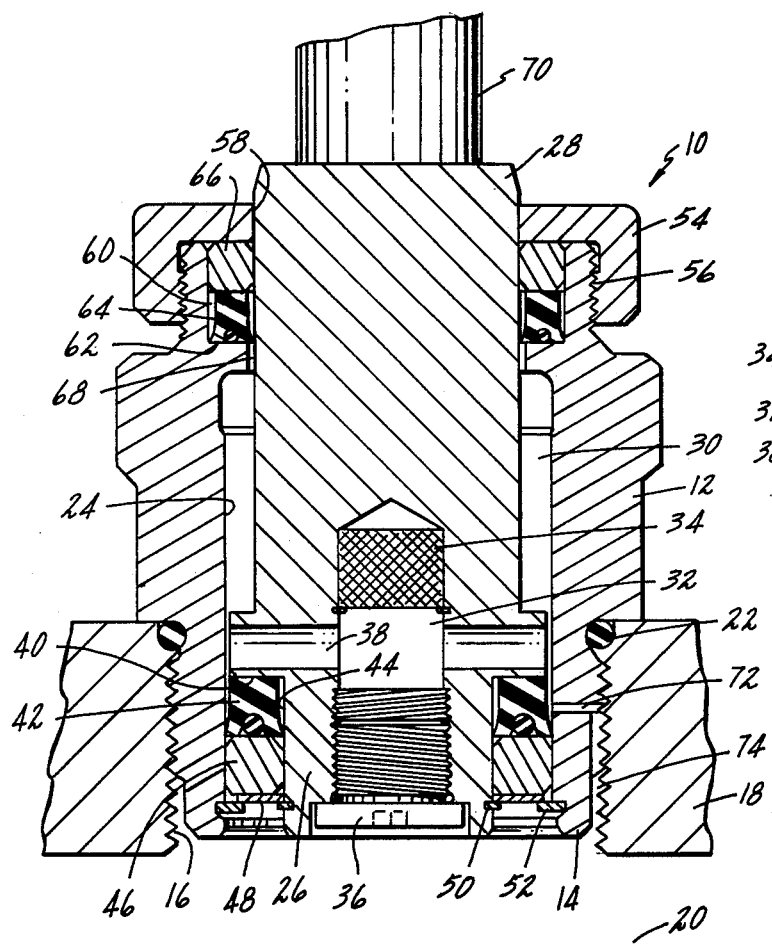
FIG. 1 is a sectional view of a nitrogen die cylinder unit according to the present invention.

In the drawing the nitrogen die cylinder unit is designated 10 and includes a cylinder 12 having a threaded open end 14 which is threaded into a port 16 of a nitrogen manifold 18. The manifold 18 has a passageway 20 therein which communicates with the lower open end of cylinder 12 through port 16. Cylinder 12 is sealed on the manifold by an O-ring 22. Within the bore 24 of cylinder 12 there is arranged a piston 26 having a piston rod 28 projecting out of the other end of the cylinder. Piston rod 28 has a diameter slightly less than the diameter of cylinder bore 24 so as to define therebetween an annular chamber 30. Piston 26 and piston 28 are formed with a central chamber 32, the upper end of which contains an oil wick 34 and the lower end of which is closed and sealed by a threaded plug 36. The central chamber 32 communicates with the annular chamber 30 through a plurality of radial passageways 38.

Piston 26 is formed with a downwardly facing shoulder 40 against which is seated an annular seal 42. Seal 42 may be of any suitable type, such as a conventional cup-shaped seal, the lips of which project downwardly and outwardly and seal against the bore 24 of the cylinder and the cylindrical surface 44 of piston 26. Below seal 42 there is arranged a bearing 46 which is in turn seated on a compression washer 48. Seal 42, bearing 46 and washer 48 are retained in assembled relation against shoulder 40 by a retainer ring 50. Another retainer ring 52 adjacent the lower end of cylinder 12 limits the downward stroke of the piston within the cylinder.

A cylinder cap 54 is threaded, as at 56, over the upper end of cylinder 12. Cap 54 has a central aperture 58 through which the piston rod 28 projects. The upper end of cylinder 12 is formed with a counterbore 60, the lower end of which is defined by a radially outwardly extending shoulder 62 on which is seated an annular seal 64, the construction of which may be the same as seat 42 at the lower end of the cylinder. The radially inner lip of seal 64 is in sealed sliding engagement with the outer periphery of piston rod 28 and the radially outer lip of seal 64 engages the counterbore 60. Between seal 64 and the under side of cap 54 there is arranged in counterbore 60 a bearing 66 which has a sliding fit with the outer periphery of piston rod 28. The inner diameter of shoulder 62 is at least slightly greater than the outer diameter of piston rod 28 so as to provide an annular clearance space 68 therebetween.

Figure 2:
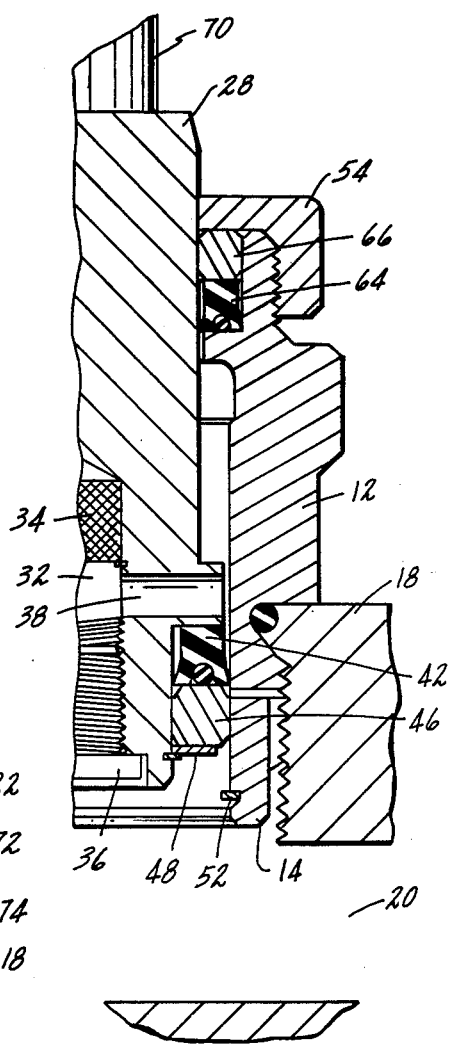
FIG. 2 is a view similar to FIG. 1 and showing the unit pressurized and arranged in a press with the press ram at its bottom dead center position.
Figure 3:
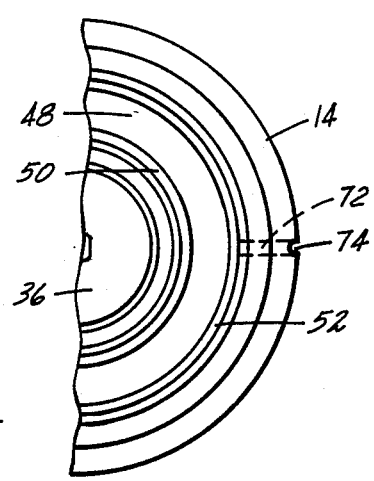
FIG. 3 is a fragmentary bottom view of the cylinder.

In the arrangement shown in FIG. 1 piston 26 is illustrated in the position it assumes when manifold 18 is not pressurized. In this condition the piston is in its lowermost, fully retracted position, the compression ring 48 abutting against retainer ring 52. When the manifold is pressurized the gas therein acts against the lower end of piston 26 and urges it upwardly as permitted by a die pin 70, or other die member abutted by the upper end of piston 28. Die pin 70 is arranged to reciprocate vertically in response to reciprocation of the ram of the press in which the die is located. As the press ram moves upwardly, die pin 70 moves upwardly under the bias of piston 26 and, when the press ram descends, die pin 70 is displaced downwardly by the press ram against the upward bias on the piston. Annular chamber 30 is reduced in length as the piston moves upwardly and increases in length as the piston moves downwardly. Therefore, the gas in chamber 30 is compressed into central cavity 32 upon upward movement of the press ram and the gas in chamber 32 is expanded into chamber 30 as the press ram descends. With the press ram at bottom dead center position, piston 26 is located at the partially retracted position shown in FIG. 2 where compression washer 48 is disposed above retainer ring 52.

The threaded portion 14 of cylinder 2 has a radially extending bleed passageway 72 which extends radially outwardly from bore 24 to the threads at the lower end portion of the cylinder. Bleed passageway 72 is disposed so that, when piston 26 is in the fully retracted position illustrated in FIG. 1, the inner end of passageway 72 communicates with bore 24 above the sealing lips around the lower edge of seal 42. However, when the unit is pressurized and the press ram is at bottom dead center position shown in FIG. 2, bleed passageway 72 communicates with the bore 24 at a location at least slightly below seal 42. Accordingly, bleed passageway 72 communicates with the annular chamber 30 only when the piston is fully retracted as shown in FIG. 1. When the piston is in the position shown in FIG. 2, bleed passageway 72 is sealed from annular chamber 30 and communicates with the manifold passageway 20 through a vertical groove 74 which extends through the threads from passageway 72 to the lower end of threaded section 14. Groove 74 preferably has a depth greater than the depth of the threads.

When the cylinder units 10 are initially mounted on a manifold, the manifold is not pressurized and piston 26 in each unit 10 will usually be in the fully retracted position shown in FIG. 1. When the manifold is charged with nitrogen under pressure the piston 26 is displaced upwardly in bore 24. However, if the piston is fully retracted, as soon as nitrogen is introduced into the manifold, the pressurized gas will flow from the manifold through groove 74 and passageway 72 into annular chamber 30 until the piston is displaced upwardly to at least the position shown in FIG. 2 where communication between passageway 72 and chamber 30 is cut off. Thus, initially chamber 30 and chamber 32 may be somewhat pressurized to some extent. For example, if manifold passageway 20 is charged with nitrogen at 1,000 p.s.i., the pressure in chambers 30,32 may rise to 200 or 300 p.s.i. before the piston is shifted upwardly sufficiently to cut off communication between passageway 72 and annular chamber 30. After the unit has been operating in a press for quite some time it is very likely that at least some gas will leak across seal 42 so that the pressure in chambers 30,32 may rise to a value approaching the pressure in the manifold.

When it becomes necessary to remove a cylinder unit 10 from the manifold to replace or repair it, the pressure in manifold 10 is relieved to atmospheric. As the pressure in the manifold is reduced, piston 26 is displaced downwardly in cylinder 12 since, at least initially, chambers 30,32 remain pressurized. However, as soon as the piston is displaced downwardly to a position wherein the lips of seal 42 are below passageway 72, the pressurized nitrogen in chambers 30,32 bleeds into the manifold through passageway 72 and groove 74., Thus, the pressure in these chamber is automatically reduced to atmospheric without the necessity of loosening plug 36.

I claim:

1. In combination, a pressurized nitrogen manifold for applying a biasing force to a die member that is axially displaceable in response to reciprocation of a ram of a press in which the die is mounted, a cylinder unit comprising a cylinder having a bore and an externally threaded open end sealingly connected with a threaded port on the manifold, a piston slideable axially in said bore, said piston having a rod on one end thereof extending axially outwardly through the opposite end of the cylinder, the free end of the rod being adapted to abut said die member, said rod having a diameter smaller than the diameter of the cylinder bore to thereby form an annular chamber between the rod and the bore, said piston having a central chamber therein in free communication with said annular chamber, said piston having an annular seal thereon slideably engaging the bore, said cylinder having an annular seal therein adjacent said opposite end thereof slideably engaging the outer periphery of the rod, said cylinder unit being arranged so that, as a result of the manifold pressure applied to the opposite end of the piston through said port, the rod is biased outwardly of the cylinder to apply said biasing force on the die member and in response to movement of the press ram to a bottom dead center position at a lower end of each normal stroke, the piston is displaced in a direction inwardly of the cylinder against the bias of the manifold pressure to a predetermined partially retracted position, said piston also being movable to a fully retracted position inwardly beyond said predetermined position when the pressure in said annular chamber exceeds the pressure in the manifold and passageway means in the cylinder extending from said bore to the open end of said cylinder, one end of said passageway means intersecting said bore at a point on the rod side of the first-mentioned seal when the piston is in said fully retracted position and on the axially opposite side of said first-mentioned seal when the piston is in said partially retracted position, the opposite end of said passageway means communicating with the manifold through the threaded port thereon, whereby during normal operation of the ram, said passageway means is not effective to establish communication between said annular chamber and the manifold, but is effective to establish such communication when the manifold pressure is reduced to atmospheric.

* * * * *